United States Patent [19]

Stegelitz et al.

[11] 4,249,993
[45] Feb. 10, 1981

[54] ADJUSTABLE BEARING SYSTEM FOR PAPER MACHINE

[75] Inventors: Wilhelmus J. Stegelitz, Charlotte, N.C.; George P. Bernreiter, Dollard des Ormeaux, Canada

[73] Assignee: Dominion Engineering Works Limited, Lachine, Canada

[21] Appl. No.: 43,753

[22] Filed: May 30, 1979

[30] Foreign Application Priority Data

Jun. 23, 1978 [CA] Canada ............................ 306098

[51] Int. Cl.³ .............................................. D21F 7/02
[52] U.S. Cl. .............................. 162/381; 308/237 A; 308/240; 74/397
[58] Field of Search ............... 308/237 R, 237 A, 240; 162/306, 381; 74/397; 100/172; 29/115

[56] References Cited

U.S. PATENT DOCUMENTS

| 1,953,194 | 4/1934 | Snyder | 74/397 |
| 2,021,935 | 11/1935 | Griswold | 74/397 |
| 3,762,881 | 10/1973 | Dunn | 308/239 |

FOREIGN PATENT DOCUMENTS 717282 9/1965 Canada.
911209 10/1972 Canada.

*Primary Examiner*—William F. Smith
*Attorney, Agent, or Firm*—Raymond A. Eckersley

[57] ABSTRACT

In a paper machine the couch roll gear drive is provided with eccentric adjustment to one of the gear support bearings, thereby permitting the setting and adjustment of the gear under working conditions, to provide satisfactory gear face contact.

A tapered housing interface fitted with a hydraulic jack-off provision ensures tight fitting of the bearing with its support housing, while permitting ready access for adjustment and lock-up, at very low cost.

3 Claims, 3 Drawing Figures

ADJUSTABLE BEARING SYSTEM FOR PAPER MACHINE

This invention is directed to a paper machine having an adjustable bearing provision.

In the construction of paper machines having driven rolls such as suction couch rolls, difficulty is experienced in the erection and commissioning phase in obtaining satisfactory meshing relation of the transmission gears. During the manufacturing process, it is not generally possible to make allowance for all of the forces, such as internal vacuum forces, acting upon the couch roll and its bearings, and accordingly, it is extremely difficult to ensure correct meshing of the gear transmission that drives the couch roll. In addition, any errors during manufacture can lead to mis-mesh. Previous solutions have involved disassembly and remachining, which is both time consuming and cumbersome, and furthermore provides no ready means of indexing to facilitate reassembly.

In accordance with the present invention, there is provided in a paper machine having a first gear, a second gear rotatably mounted in meshing relation therewith, including bearing means supporting the second gear for rotation therebetween the improvement comprising eccentric mounting means supporting at least one of the bearings in orbitally displaceable relation, to permit selective positioning of the gears in meshing relation.

The arrangement comprises a pair of complementary eccentric rings supporting the bearing in adjustable relation within the bearing housing, adjustment being effected by relative rotation between the rings. The bearings for the related gear are of the self aligning type.

The eccentric adjustment rings are provided with an axial taper at their interface, to permit locking-up and to reduce the required degree of machining accuracy for the components; hydraulic jacking arrangement is incorporated with the tapered rings to ensure ready separation of the rings, which simultaneously also lubricates the interface of the rings to minimize required adjustment forces. Positive locking of the rings is obtained by the provision of fitted dowel pins, to withstand vibration and shock.

Certain embodiments of the invention are described, reference being made to the accompanying drawings, wherein.

Figure 1:
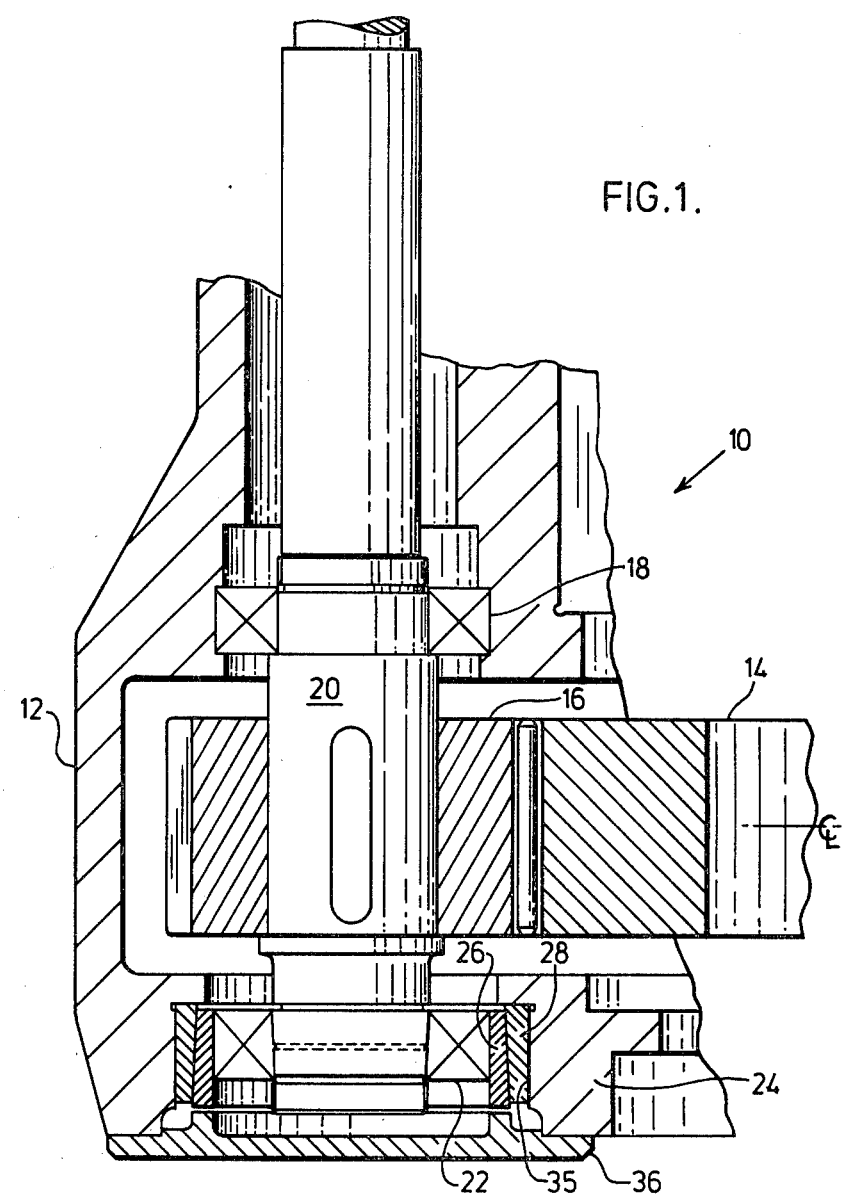
FIG. 1 is a partial plan view, in section showing a portion of a reduction gear drive incorporating the invention.
Figure 2:
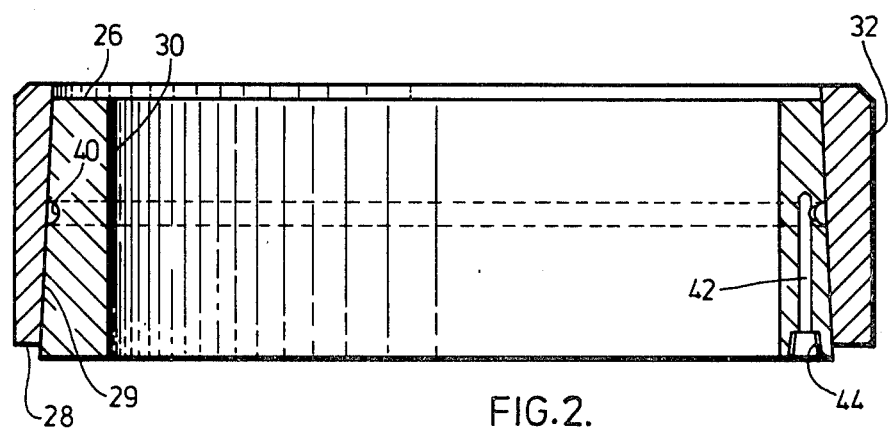
FIG. 2 is an enlarged view of the adjusting ring portion of FIG. 1.

Referring to the drawings, the portion 10 of the reduction gear includes a casing 12 having a main gear 14 and a pinion 16 rotatably mounted in meshing relation therein. The pinion shaft 20 is carried between a front bearing 18 and rear bearing 22, both of which bearings are self aligning.

Figure 3:
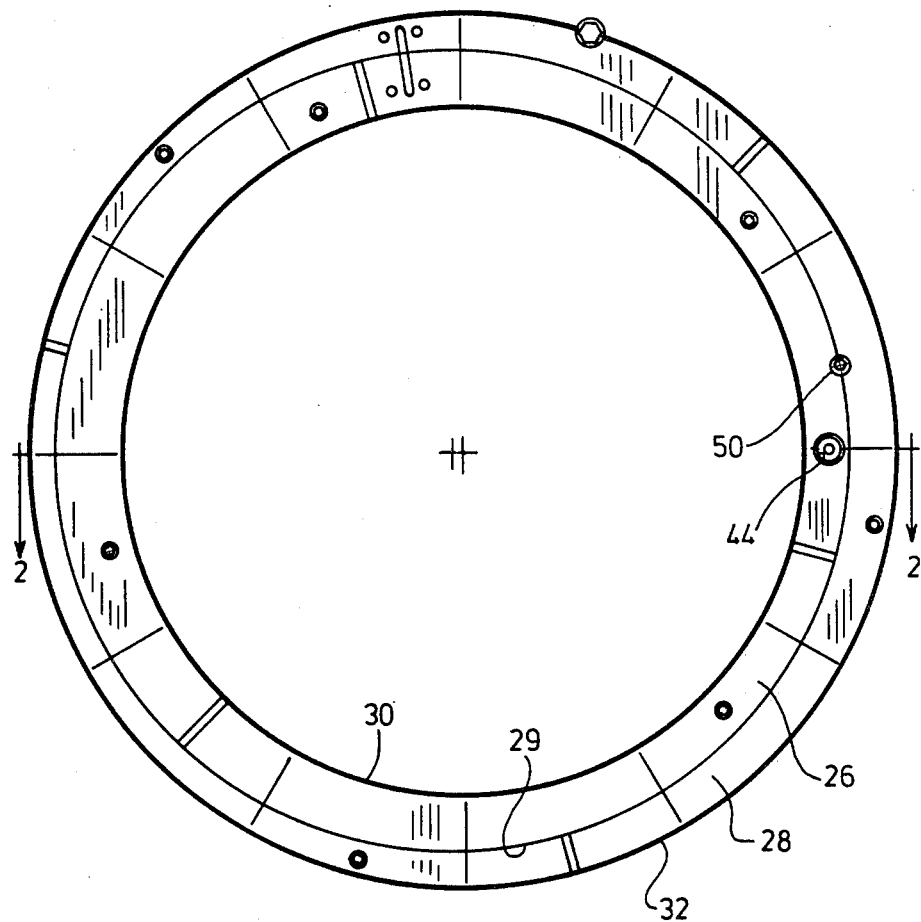
FIG. 3 is an end view of the rings of FIG. 2.

The rear bearing 22 is mounted in the rear bearing housing 24 by means of interposed eccentric rings 26, 28, the eccentricity of which may best be seen in FIG. 3.

The inner bore 30 of the inner ring 26 is a cylindrical bore to receive the outer face of the rear bearing 22, and the outer face 32 of outer ring 28 also is cylindrical to fit the bore 35 of housing 24. A bearing cover 36 normally encloses the housing 24.

The interface 29 between ring 26 and ring 28 is axially tapered, having a groove recess 40 therein extending for 360°. A connecting passage 42 connects the groove recess 40 with a threaded hole 44 to which a pressure source such as a grease gun can be connected, by means of which the rings 26, 28 may be forced apart, on application of hydraulic pressure therebetween.

In order to correctly set-up the arrangement, having duplicated as-far as possible the conditions under which the gear will operate, such as the application of operational vacuum to the suction box of the couch roll to which the gear 14 is attached in driving relation, the tapered rings 26, 28 are "split" by the application of hydraulic pressure in the groove 40, thereby freeing the two rings for relative rotation about their respective polar axis. Such rotation has the effect of repositioning the polar axis of bearing 22, thereby changing the meshing relation between the teeth of pinion 16 and the teeth of main gear 14.

By making suitable relative angular adjustments to the two rings 26, 28, an optimum condition for tooth contact can be established, at which juncture the rings 26, 28 are forced axially together in mutually locking relation, so as to freeze the bearing 22, and maintain the desired gear contact relationship. Dowell recesses, 50 are then drilled between the rings and tapped, and suitable threaded dowel pins inserted. The rings 26, 28, besides being dowelled together, also are dowelled to the bearing housing 24. Suitable indicia markings also are provided to the outer end faces of rings 26, 28 to facilitate accurate reassembly in case of subsequent disassembly.

While the present illustration relates to a bearing supporting a gear in a particular position in a paper machine, it will be recognized that the simplicity, low cost and practicality of the adjustable bearing arrangement conveys similar advantages in other uses and locations.

What I claim as new and desire to secure by Letters Patent of the United States is:

1. In a paper machine having a first gear, a second gear rotatably mounted in meshing relation therewith, including bearing means supporting the second gear for rotation therebetween, the improvement comprising a pair of complementary eccentric rings in supporting relation with a said bearing to permit orbital repositioning of said bearing by relative rotation of one ring relative to the other, said eccentric rings having an axially tapering, separable interface therebetween, to provide a tight fit of said bearing in repositionable relation in said housing, and hydraulic jacking means for connection with a fluid pressure source, in use, for freeing said rings off said tapering interface.

2. The machine as claimed in claim 1, said jacking means including a groove recess with a threaded entry, for connection in use with lubrication means to force lubricant between said rings in axial freeing relation therebetween.

3. The machine as claimed in, claim 1 wherein said first gear is connected in driving relation with a couch roll having suction applying means located therein.

* * * * *